United States Patent
Wu et al.

(10) Patent No.: US 11,490,304 B2
(45) Date of Patent: Nov. 1, 2022

(54) METHOD AND APPARATUS FOR UE HANDOVER

(71) Applicant: Lenovo (Beijing) Limited, Beijing (CN)

(72) Inventors: Lianhai Wu, Beijing (CN); Jing Han, Beijing (CN); Haiming Wang, Beijing (CN); Xiaodong Yu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 63 days.

(21) Appl. No.: 16/960,581

(22) PCT Filed: Jan. 8, 2018

(86) PCT No.: PCT/CN2018/071755
§ 371 (c)(1),
(2) Date: Jul. 8, 2020

(87) PCT Pub. No.: WO2019/134163
PCT Pub. Date: Jul. 11, 2019

(65) Prior Publication Data
US 2020/0396660 A1    Dec. 17, 2020

(51) Int. Cl.
*H04W 36/00* (2009.01)
*H04W 76/30* (2018.01)
*H04W 76/27* (2018.01)

(52) U.S. Cl.
CPC . *H04W 36/0094* (2013.01); *H04W 36/00835* (2018.08); *H04W 36/00837* (2018.08); *H04W 76/27* (2018.02); *H04W 76/30* (2018.02)

(58) Field of Classification Search
CPC ........... H04W 36/00837; H04W 76/27; H04W 36/00835; H04W 36/0094; H04W 76/30
See application file for complete search history.

(56) References Cited

U.S. PATENT DOCUMENTS

| | | | | |
|---|---|---|---|---|
| 2009/0225709 | A1* | 9/2009 | Wager | H04W 72/0413 370/329 |
| 2013/0250773 | A1* | 9/2013 | Ohta | H04W 36/0088 370/315 |

(Continued)

FOREIGN PATENT DOCUMENTS

| | | |
|---|---|---|
| CN | 101400088 A | 4/2009 |
| CN | 101521879 A | 9/2009 |

(Continued)

OTHER PUBLICATIONS

PCT/CN2018/071755, "International Search Report and the Written Opinion of the International Search Authority" ISA/CN, State Intellectual Property Office of the P.R. China, dated May 16, 2018, pp. 1-6.

*Primary Examiner* — Anez C Ebrahim
(74) *Attorney, Agent, or Firm* — Kunzler Bean & Adamson

(57) ABSTRACT

Methods and apparatus for UE handover are disclosed. One method of a UE comprising receiving a handover configuration related to a conditional handover command including at least one handover condition and a plurality of candidate cells, wherein the handover condition is configured per candidate cell; and selecting a target cell from the plurality of candidate cells in response to the target cell meeting the corresponding handover condition. The methods and apparatus herein not only increase the likelihood of a successful handover while the power consumption and/or processing time for the UE are acceptable, the processing resource is also saved for eNB.

15 Claims, 7 Drawing Sheets

(56) References Cited

U.S. PATENT DOCUMENTS

| | | |
|---|---|---|
| 2014/0045500 A1 | 2/2014 | Dimou et al. |
| 2015/0237533 A1 | 8/2015 | Keskitalo et al. |
| 2015/0264622 A1* | 9/2015 | Ueda .................... H04W 36/32 |
| | | 455/438 |
| 2017/0181051 A1 | 6/2017 | Yi et al. |
| 2022/0109967 A1* | 4/2022 | Futaki .................. H04W 36/08 |

FOREIGN PATENT DOCUMENTS

| | | |
|---|---|---|
| CN | 105323726 A | 2/2016 |
| EP | 1947889 A2 | 7/2008 |
| EP | 2833669 A1 | 2/2015 |
| WO | 2012176010 A2 | 12/2012 |

\* cited by examiner

METHOD AND APPARATUS FOR UE HANDOVER

FIELD

The subject matter disclosed herein relates generally to wireless communication and more particularly relates to the method and apparatus for UE handover from a source cell to a target cell.

BACKGROUND

The following abbreviations are herewith defined, at least some of which are referred to within the following Description: Third Generation Partnership Project ("3GPP"), User Entity/Equipment (Mobile Terminal) ("UE"), Access Stratum ("AS"), Access Network ("AN"), Core Network ("CN"), Radio Resource Control ("RRC"), Packet Data Convergence Protocol ("PDCP"), Serial Number ("SN"), Radio Access Network ("RAN"), Radio Network Layer/Transmission Network Layer ("RNL/TNL"), Downlink ("DL"), Uplink ("UL"), Handover ("HO"), Receiving ("RX"), Transmitting ("TX"), Tracking Area ("TA"), Enhanced Radio Access Bearers ("E-RABs"), Radio Access Bearers ("RABs"), Cell Radio Network Temporary Identifier ("C-RNTI"), Reference Signal Receiving Power ("RSRP"), Reference Signal Receiving Quality ("RSRQ"), Common Pilot Channel ("CPICH"), Random Access Procedure ("RACH"), Hybrid Automatic Repeat Request ("HARQ"), System Information Block ("SIB"), Radio Link Failure ("RLF"), Information Element ("IE"), Next Generation Evolved Node B ("ng-eNB"), Evolved Node B ("eNB"), Evolved Packet Core ("EPC"), Mobility Management Entity ("MME"), Radio Resource Management ("RRM"), Fifth Generation Mobility Communication ("5G"), Fifth Generation Core ("5GC"), Public Land Mobile Network ("PLMN"), VISITED Public Land Mobile Network ("VPLMN"), and Long Term Evolution ("LTE").

In LTE, UE handover from a source cell to a target cell includes: S1-based handover in which MME is involved to forward the handover-related messages between the source eNB and the target eNB over the S1 interface; X2-based handover in which the handover-related messages are directly exchanged between the source eNB and the target eNB over the X2 interface; and Intra-eNB handover in which the UE is camped in a different cell managed by the same source eNB. The present disclosure focuses on X2-based handover.

In a LTE system, handover failure often occurs due to the following three reasons:

[Handover Too Late] An RLF occurs after the UE has stayed for a long period of time in the source cell; the UE attempts to re-establish the radio link connection in a different cell.

[Handover Too Early] An RLF occurs shortly after a successful handover from a source cell to a target cell or a handover failure occurs during the handover procedure; the UE attempts to re-establish the radio link connection in the source cell.

[Handover to a Wrong Cell] An RLF occurs shortly after a successful handover from a source cell to a target cell or a handover failure occurs during the handover procedure; the UE attempts to re-establish the radio link connection in a cell other than the source cell and the target cell. This kind of RLF generally occurs in the overlapping area covered by three cells.

Therefore, a new study on UE handover from a source cell to a target cell is required to increase the likelihood of a successful handover. Further, the power consumption and/or processing time needs to be considered for the UE, and the processing resource also needs to be saved for eNB.

BRIEF SUMMARY

The mechanisms for UE handover based on the X2 interface has been defined in 3GPP TS36.300, wherein a primary objective is that the target cell is selected by the source (serving) eNB and the UE is camped on the target cell according to the handover command in the RRCConnectionReconfiguration message transmitted from the source eNB. However, the target cell selected by the source eNB may not be suitable for the UE to be camped, e.g. the UE may move back from the edge of the source (serving) cell to the center of the source cell after transmitting the measurement report to the source eNB. In another aspect, as the number of UEs located in the edge of the cells is increased, the processing resource of the corresponding eNB is decreased.

Method and apparatus for UE handover determined by a UE itself have not been developed yet.

Similar with legacy UE handover, the conditional UE handover may be also triggered by the measurement report transmitted from the UE. In some configurations, the RRCConnectionReconfiguration message indicating a handover configuration related to a conditional handover command is configured by an eNB according to the measurement report from the UE, and then transmitted to a UE. The UE may apply the handover to a candidate cell in response to the candidate cell meeting the handover condition included in the conditional handover command. Before applying the handover, the UE may suspend this RRCConnectionReconfiguration message and evaluate whether the condition are met for each of the candidate cells also included in the conditional handover command. As may be appreciated, power and/or processing time may be required for the UE to perform such an evaluation. This may result in an impact on the UE in the case that none of the candidate cells meets the handover condition for a long time after the conditional handover command is received. For example, the UE moves towards an edge of the source cell so as to transmit a measurement report to the source eNB indicating the neighbour cells (possible candidate cells) have a considerable signal strength, however the UE may then move back to a center of the source cell or may not move beyond the source cell. In such a scenario, it is difficult for the UE to keep evaluating the received signal strength for all of the candidate cells.

Methods and apparatus for UE handover from a source cell to a target cell are disclosed. One method of a UE comprises: receiving a handover configuration related to a conditional handover command including at least one handover condition and a plurality of candidate cells, wherein the handover condition is configured per candidate cell; and selecting a target cell from the plurality of candidate cells in response to the target cell meeting the corresponding handover condition.

In another aspect, the conditional handover command is associated with a release timer, the UE releases the handover configuration in response to none of the plurality of candidate cells meeting the corresponding handover condition when the release timer expires.

Alternatively, each of the plurality of candidate cells is associated with a release timer, the UE releases the handover configuration corresponding to a candidate cell in response to the candidate cell not meeting the corresponding handover condition when the release timer expires.

In another aspect, the conditional handover command includes events for releasing the handover configuration, the UE releases the handover configuration corresponding to a candidate cell in response to the events being triggered for the candidate cell. Wherein, the events include one or both of the following: the candidate cell becomes worse than a threshold value during a first configured timer, and/or the candidate cell becomes offset worse than the source cell during a second configured timer.

The method and apparatus herein not only increase the likelihood of a successful handover while the power consumption and/or processing time for the UE are acceptable, the processing resource is also saved for eNB.

BRIEF DESCRIPTION OF THE DRAWINGS

A more particular description of the embodiments briefly described above will be rendered by reference to specific embodiments that are illustrated in the appended drawings. Given that these drawings depict only some embodiments and are not therefore to be considered to limit scope, the embodiments will be described and explained with additional specificity and detail through the use of the accompanying drawings, in which.

DETAILED DESCRIPTION

Figure 1:
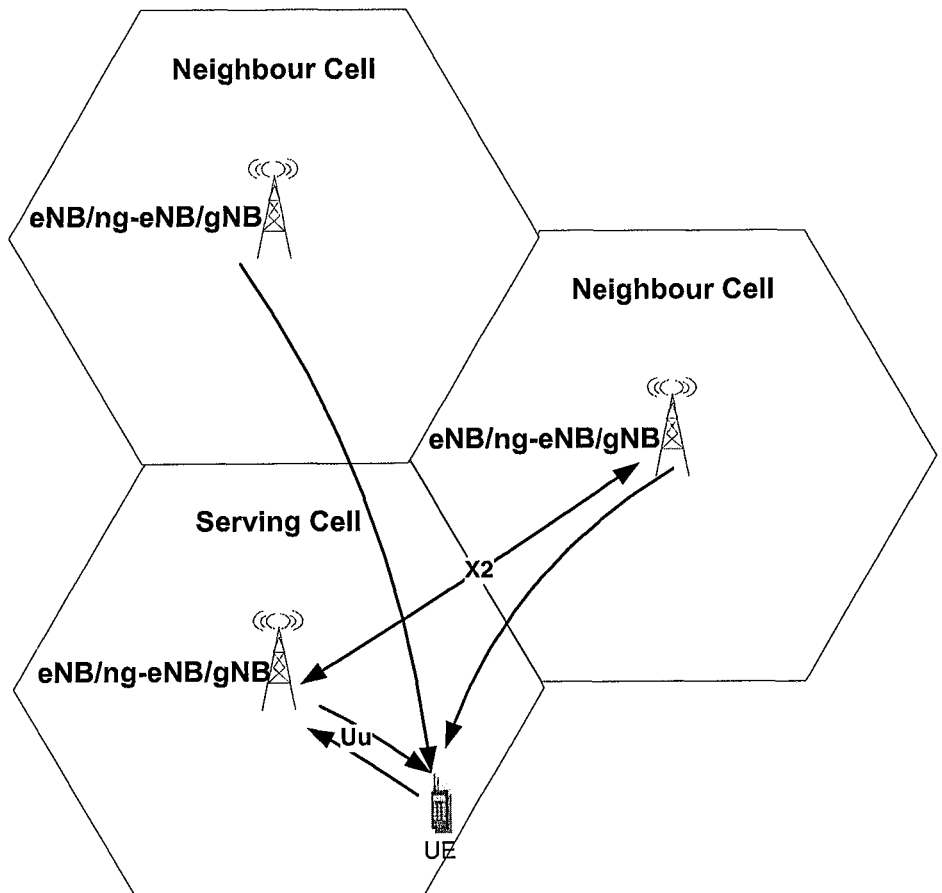
FIG. 1 is a schematic diagram illustrating the communications among the serving cell, neighbour cell and the UE according to one embodiment, wherein, both the serving cell and the neighbour cells can be managed by an eNB/a ng-eNB.

As will be appreciated by one skilled in the art, aspects of the embodiments may be embodied as a system, apparatus, method, or a program product. Accordingly, embodiments may take the form of an all-hardware embodiment, an all-software embodiment (including firmware, resident software, micro-code, etc.), or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field-programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer-readable storage devices storing machine-readable code, computer-readable code, and/or program code, collectively referred to hereafter as "code". The storage devices may be tangible, non-transitory, and/or non-transmission. The storage devices may not embody signals. In a certain embodiment, the storage devices only employ signals for accessing code.

Any combination of one or more computer-readable medium may be utilized. The computer-readable medium may be a computer-readable storage medium. The computer-readable storage medium may be a storage device storing the code. The storage device may be, for example, but is not limited to being, an electronic, magnetic, optical, electromagnetic, infrared, holographic, micromechanical, or semiconductor system, apparatus, or device, or any suitable combination of the foregoing.

A non-exhaustive list of more specific examples of the storage device may include the following: an electrical connection having one or more wires, a portable computer diskette, a hard disk, random-access memory ("RAM"), read-only memory ("ROM"), an erasable programmable read-only memory ("EPROM" or flash memory), a portable compact disc read-only memory ("CD-ROM"), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Reference throughout this specification to "one embodiment", "an embodiment", or similar language, means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but not limited to", unless expressly specified otherwise. An enumerated listing of items does not imply that any or all of the items are mutually exclusive, unless expressly specified otherwise. The terms "a", "an", and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions—executed via the processor of the computer or other programmable data-processing apparatus—create a means for implementing the functions/acts specified in the schematic flowchart diagrams and/or schematic block diagrams.

The code may also be stored in a storage device that can direct a computer, other programmable data-processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data-processing apparatus, or other devices to cause a series of operational steps to be performed on the computer, other programmable apparatus, or other devices to produce a computer implemented process such that the code executed on the computer or other programmable apparatus provides processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s). One skilled in the relevant art will recognize, however, that the flowchart diagrams need not necessarily be practiced in the sequence shown in the Figures, and are able to be practiced without one or more of the specific steps, or with other steps not shown in the Figures.

It should also be noted that in some alternative implementations the functions noted in the block may occur out of the order noted in the Figures. For example, two blocks shown in succession may in fact be substantially executed in concurrence, or the blocks may sometimes be executed in reverse order, depending upon the functionality involved. Other steps and methods may be conceived that are equivalent in function, logic, or effect to one or more blocks, or portions thereof, from the illustrated Figures.

The description of elements in each figure may refer to elements of proceeding figures. Like numbers refer to like elements in all figures, including alternate embodiments of like elements.

Enhancements to UE handover should be studied to increase the likelihood of a successful handover. Meanwhile, the power consumption and/or processing time need(s) to be considered for the UE, and the processing resource also need to be saved for eNB. While eNB is a based station for the 4G network, methods, apparatus and systems disclosed herein can also be used for other wireless networks. Thereby, eNB disclosed herein can be replaced with gNB, which is a base station for the 5G network, or other base stations in other wireless networks.

Disclosed herein are methods, apparatus, and systems that provide a UE handover mechanism, which is herein referred to as conditional handover, in which at least one handover condition and a plurality of candidate cells are indicated in the RRCConnectionReconfiguration message from eNB to the UE, wherein the handover condition is configured per candidate cell, and then a target cell meeting the corresponding handover condition is selected from the plurality of candidate cells by the UE itself, while in the legacy UE handover mechanism, the target cell is selected by eNB and then indicated in the RRCConnectionReconfiguration message to the UE. Further, the handover condition transmitted to UE is similar with the legacy handover condition used by eNB to evaluate the candidate cells. In another aspect, the MobilityControlInfo IE defined in the RRCConnectionReconfiguration message is used to indicate a handover configuration related to a conditional handover command, and includes the at least one handover condition and a plurality of candidate cells.

FIG. 1 is a schematic diagram illustrating the communications among the serving cell, neighbour cell and the UE according to one embodiment, wherein both the serving cell and the neighbour cells can be managed by an eNB/a ng-eNB/gNB. Within the scope of the disclosure, "serving cell" and "source cell" are interchangeable terms. As shown in FIG. 1, the eNB/ng-eNB/gNB of the serving cell has a X2 interface with that of the neighbour cell. The messages related to UE handover are exchanged over the X2 interface. The UE has a Uu interface with the eNB/ng-eNB/gNB of the serving cell, and monitors the signals from the neighbour cells. The UE measures the wireless signal strength of the neighbour cell which may be represented by RSRP and/or RSRQ, both of which can be measured on RS (Reference Signal).

Figure 2:
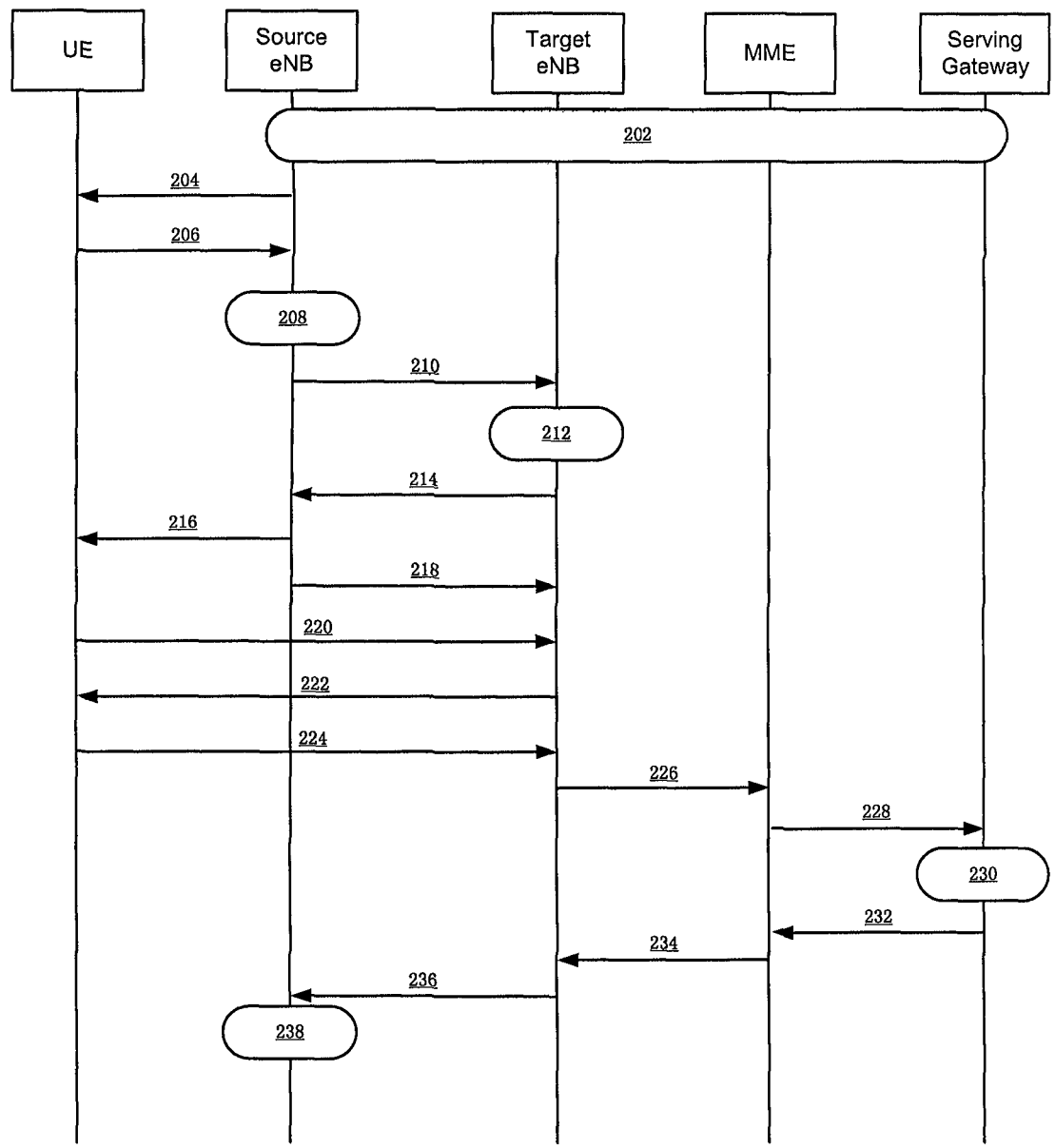
FIG. 2 is a call flow illustrating that a target cell is determined by the source eNB in the procedure of UE handover according to one embodiment.

FIG. 2 is a call flow illustrating that a target cell is determined by the source eNB in the procedure of UE handover according to one embodiment. The call flow in FIG. 2 illustrates the legacy UE handover mechanism, in which the target cell is selected by eNB.

In step 202, the UE context within the source eNB contains information regarding roaming and access restrictions which were provided either at connection establishment or at the last TA update.

In step 204, the source eNB configures the UE measurement procedures according to the roaming and access restriction information and e.g. the available multiple frequency band information. Measurements provided by the source eNB may assist the function controlling the UE's connection mobility.

In step 206, a MEASUREMENT REPORT is triggered and sent to the eNB.

In step 208, the source eNB makes a decision based on the MEASUREMENT REPORT and RRM information to hand off the UE.

In step 210, the source eNB issues a HANDOVER REQUEST message to the target eNB passing necessary information to prepare the HO at the target side.

In step 212, Admission Control may be performed by the target eNB depending on the received E-RAB QoS information to increase the likelihood of a successful HO, if the resources can be granted by the target eNB. The target eNB configures the required resources according to the received E-RAB QoS information and reserves a C-RNTI and optionally reserves a RACH preamble. The configuration to be used in the target cell can either be specified independently (i.e. an "establishment") or as a delta compared to the configuration used in the source cell (i.e. a "reconfiguration").

In step 214, the target eNB prepares the HO with L1/L2 and sends the HANDOVER REQUEST ACKNOWLEDGE to the source eNB. The HANDOVER REQUEST ACKNOWLEDGE message includes a transparent container to be sent to the UE as an RRC message to perform the handover. The container includes a new C-RNTI, target eNB security algorithm identifiers for the selected security algorithms, may include a dedicated RACH preamble, and possibly some other parameters i.e. access parameters, SIBs, etc. If the RACH-less HO is configured, the container includes a timing adjustment indication and optionally a pre-allocated uplink grant. The HANDOVER REQUEST ACKNOWLEDGE message may also include RNL/TNL information for the forwarding tunnels, if necessary.

In step 216, the target eNB generates the RRC message to perform the handover, i.e. the RRCConnectionReconfiguration message including the MobilityControlInformation, to be sent by the source eNB towards the UE. The source eNB performs the necessary integrity protection and ciphering of the message. The UE receives the RRCConnectionReconfiguration message with necessary parameters (i.e. new C-RNTI, target eNB security algorithm identifiers, and an optionally dedicated RACE preamble, target eNB, SIBs, etc.) and is commanded by the source eNB to perform the HO. The UE does not need to delay the handover execution for delivering the HARQ/ARQ responses to the source eNB.

In step 218, the source eNB sends the SN STATUS TRANSFER message to the target eNB to convey an uplink PDCP SN receiver status and a downlink PDCP SN transmitter status of E-RABs for which PDCP status preservation applies (i.e. for RLC AM). The uplink PDCP SN receiver status includes at least the PDCP SN of the first missing UL SDU and may include a bit map of the receive status of the out of sequence UL SDUs that the UE needs to retransmit in the target cell, if there are any such SDUs. The downlink PDCP SN transmitter status indicates the next PDCP SN that the target eNB shall assign to new SDUs not yet having a PDCP SN. The source eNB may omit sending this message if none of the E-RABs of the UE shall be treated with PDCP status preservation.

In step 220, if the RACH-less HO is not configured, after receiving the RRCConnectionReconfiguration message including the MobilityControlInformation, the UE performs synchronization to target eNB and accesses the target cell via RACH, following a contention-free procedure if a dedicated RACH preamble was indicated in the MobilityControlInformation, or following a contention-based procedure if no dedicated preamble was indicated. The UE derives target eNB specific keys and configures the selected security algorithms to be used in the target cell. If the RACH-less HQ is configured, the UE performs synchronization to the target eNB. The UE derives target eNB specific keys and configures the selected security algorithms to be used in the target cell.

In step 222, if RACH-less HQ is not configured, the target eNB responds with UL allocation and timing advance. If the RACH-less HO is configured and the UE did not get the periodic pre-allocated uplink grant in the RRCConnection-Reconfiguration message including the MobilityControlInfo IE, the UE receives uplink grant via the PDCCH of the target cell. The UE uses the first available uplink grant after synchronization to the target cell.

In step 224, when the RACH-less HO is not configured and the UE has successfully accessed the target cell, the UE sends the RRCConnectionReconfigurationComplete message (C-RNTI) to confirm the handover, along with an uplink Buffer Status Report, whenever possible, to the target eNB, which indicates that the handover procedure is completed for the UE. The target eNB verifies the C-RNTI sent in the RRCConnectionReconfigurationComplete message. The target eNB can now begin sending data to the UE. When the RACH-less HO is configured, after the UE has received the uplink grant, the UE sends the RRCConnectionReconfigurationComplete message (C-RNTI) to confirm the handover, along with an uplink Buffer Status Report, whenever possible, to the target eNB. The target eNB verifies the C-RNTI sent in the RRCConnectionReconfigurationComplete message. The target eNB can now begin sending data to the UE. The handover procedure is completed for the UE when the UE receives the UE contention resolution identity MAC control element from the target eNB.

In step 226, the target eNB sends a PATH SWITCH REQUEST message to MME to inform that the UE has changed cell.

In step 228, the MME sends a MODIFY BEARER REQUEST message to the Serving Gateway.

In step 230, the Serving Gateway switches the downlink data path to the target side. The Serving Gateway sends one or more "end marker" packets on the old path to the source eNB and then can release any U-plane/TNL resources towards the source eNB.

In step 232, the Serving Gateway sends a MODIFY BEARER RESPONSE message to the MME.

In step 234, the MME confirms the PATH SWITCH REQUEST message with the PATH SWITCH REQUEST ACKNOWLEDGE message.

In step 236, by sending the UE CONTEXT RELEASE message, the target eNB informs success of HO to source eNB and triggers the release of resources by the source eNB. The target eNB sends this message after the PATH SWITCH REQUEST ACKNOWLEDGE message is received from the MME.

In step 237, upon reception of the UE CONTEXT RELEASE message, the source eNB can release radio and C-plane related resources associated to the UE context.

In the communication system described in FIG. 2, handover failure may occur due to the three reasons mentioned above: Handover Too Late, Handover Too Early and Handover to A Wrong Cell. Therefore, an enhancement to UE handover from a source cell to a target cell is disclosed hereinafter to increase the likelihood of a successful HO.

Figure 3:
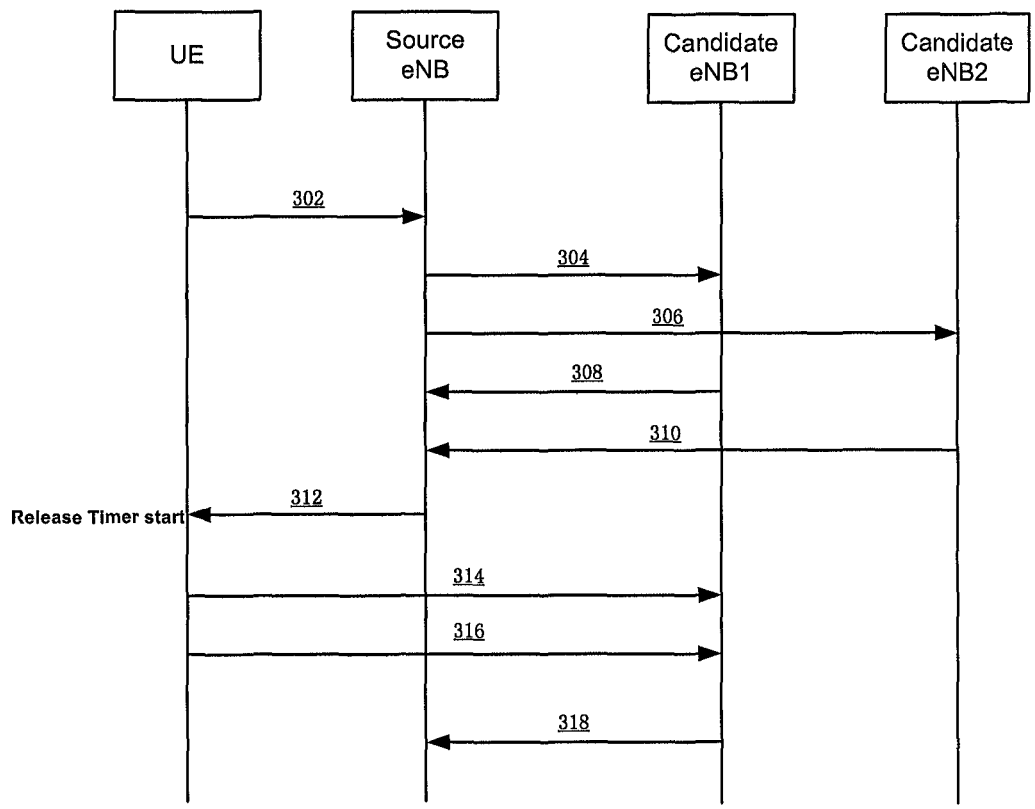
FIG. 3 is a call flow illustrating that a target cell is determined by the UE itself in the procedure of UE handover according to one embodiment.

FIG. 3 is a call flow illustrating that a target cell is determined by the UE itself in the procedure of UE handover according to one embodiment.

In step 302, the UE measures the wireless signal strength of the neighbour cells which may be represented by RSRP and/or RSRQ, both of which can be measured on RS. The UE reports the measurement results.

In steps 304 and 306, if the source eNB managing the serving cell makes a decision to perform the conditional handover based on the measurement result from the UE, the source eNB sends the handover requests to the candidate eNB(s) managing the candidate cell(s), such as candidate eNB1 or candidate eNB2. The handover requests may be sent to more than one candidate eNB.

In steps 308 and 310: the source eNB receives the handover acknowledge from the candidate eNB(s). The number of candidate eNBs which transmit handover acknowledge could be more than one.

In step 312, the RRCConnectionReconfiguration message including the MobilityControlInfo IE is configured by the source eNB and transmitted to the UE. The MobilityControlInfo IE defined in the RRCConnectionReconfiguration message is used to indicate a handover configuration related to a conditional handover command, and includes at least one handover condition and a plurality of candidate cells. In one embodiment, the handover condition is configured per candidate cell. For example, if there are two candidate cells included in MobilityControlInfo IE, each of the two candidate cells is configured a handover condition. In another embodiment, the handover condition is configured for all of the candidate cells. Still in the above example, the two candidate cells refer to a same handover condition.

The handover condition transmitted to the UE is similar/the same with the legacy handover condition used by the eNB to evaluate the candidate cells. For example, the handover condition includes a handover hysteresis threshold value and a timer for handover trigger. It is required that the signal strength of the target cell, such as the RSRP and/or RSRQ, is better than that of the source cell by the handover hysteresis threshold value during the timer for the handover trigger, which is also referred as the target cell becomes offset better than a source cell during the timer for handover trigger.

Once the UE receives the RRCConnectionReconfiguration message for conditional handover command, a release timer is started, and the handover procedure is required to be completed before the expiration of this in order to avoid the RRCConnectionReconfiguration message being suspended for a long period of time at the UE side. The release timer may be indicated in the MobilityControlInfo IE defined in the RRCConnectionReconfiguration message. In one embodiment, the release timer is larger than the timer for the handover trigger so as to adequately evaluate the signal strength of the candidate cell(s). The release timer may be configured per conditional handover command or per candidate cell, which will be described in FIG. 4.

In step 314, the UE selects a target cell from the plurality of candidate cells in response to the target cell meeting the corresponding handover condition. There may be more than one candidate cell which meets the corresponding handover condition, and in one embodiment the UE selects the candidate cell, which meets the corresponding handover condition firstly, as the target cell. After selecting the target cell, the UE applies the information included in the RRCConnectionReconfiguration message and accesses the target cell.

In step 316, the UE transmits the RRCReconfiguration-Complete message to the target eNB, i.e. the candidate eNB1 in FIG. 3.

In step 318, the target eNB, i.e. candidate eNB1 in FIG. 3, informs the source eNB that the handover is completed successfully.

Figure 4:
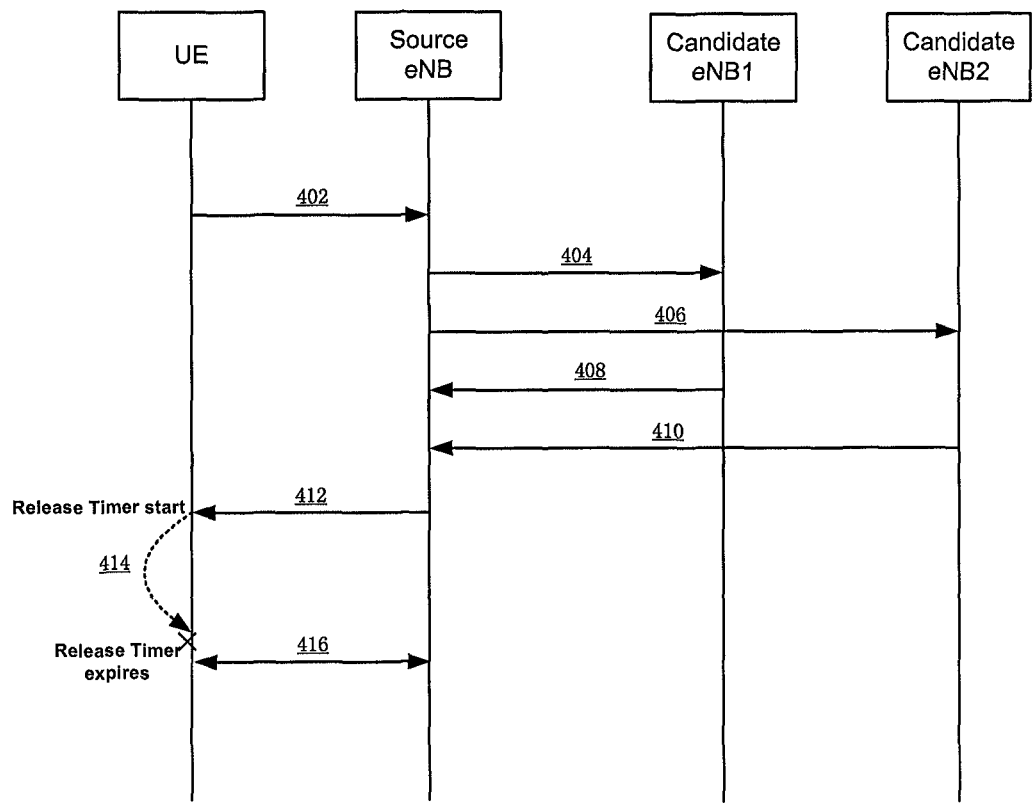
FIG. 4 is a call flow illustrating that a handover configuration related to a conditional handover command is released in response to a release timer expiring according to one embodiment.

FIG. 4 is a call flow illustrating that a handover configuration related to a conditional handover command is released in response to a release timer expiring according to one embodiment. As described above, the power consumption and/or processing time needs to be considered for the UE, thereby a release timer is involved to release the handover configuration related to the conditional handover command in a timely manner. The steps 402-412 are similar with steps 302-312, thereby the descriptions thereof are omitted for the purpose of brevity.

In step 412, once the UE receives the RRCConnection-Reconfiguration message for conditional handover command, a release timer is started, and the handover procedure is required to be completed before the expiration of the release timer.

The release timer may be configured per conditional handover command, i.e., the release timer is applied for all of the candidate cells in the RRCReconfigurationComplete message by the UE. In this case, in step 414 the UE releases the handover configuration related to the conditional handover command in response to none of the plurality of candidate cells meeting the corresponding handover condition when the release timer expires.

In another embodiment, the release timer may be configured per candidate cell, e.g., a different release timer may be applied for different candidate cells in the RRCReconfigurationComplete message by the UE. In this case, in step 414, the UE releases the handover configuration corresponding to a candidate cell in response to the candidate cell not meeting the corresponding handover condition when the release timer expires.

In step 416, in response to the UE being unable to comply with the handover configuration included in the RRCConnectionReconfiguration message, the UE may continue using the configuration used prior to the reception of the RRCConnectionReconfiguration message, i.e. the UE re-establishes the RRC connection with the source eNB.

Figure 5:
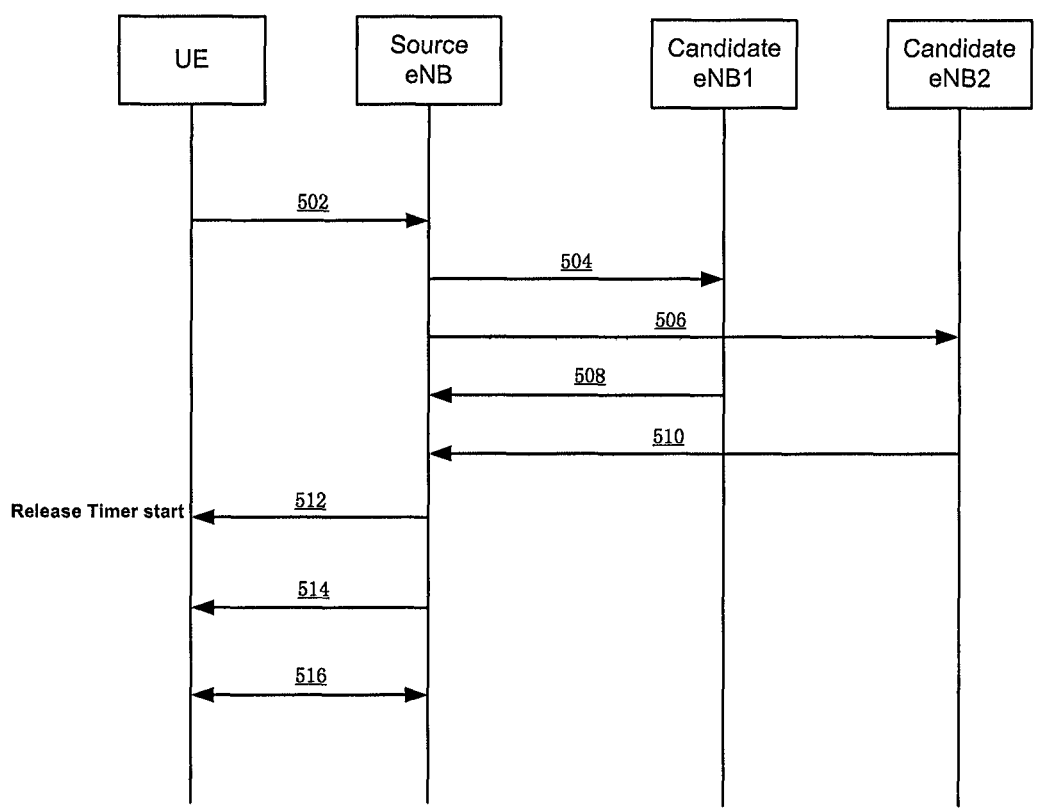
FIG. 5 is a call flow illustrating that a handover configuration related to a conditional handover command is released in response to receiving a certain event according to one embodiment.

FIG. 5 is a call flow illustrating that a handover configuration related to a conditional handover command is released in response to receiving a certain event according to one embodiment. In one embodiment, the conditional handover command may include events for releasing the handover configuration; the UE shall release the handover configuration corresponding to a candidate cell in response to the events being triggered for the candidate cell. The steps 502-512 are similar with steps 302-312, thereby the descriptions thereof are omitted for the purpose of brevity.

In step 514, after the UE receives the RRCConnection-Reconfiguration message for conditional handover command in step 512 and before the release timer expires, the source eNB transmits a certain event which causes the UE to release the handover configuration related to the conditional handover command.

The events include one or both of the following: the signal strength of the candidate cell, such as RSRP and/or RSRQ, becomes worse than a threshold value during a first configured timer, the signal strength of the target cell is worse than that of the source cell by an offset value during a second configured timer, i.e., the candidate cell becomes offset worse than the source cell during the second configured timer. As may be appreciated, the offset value for the release event may be different or same with the handover hysteresis threshold value for selecting a target cell. As may also be appreciated, the first and second configuration timer may be different or same.

In step 516, in response to the UE being unable to comply with the handover configuration included in the RRCConnectionReconfiguration message, the UE may continue using the configuration used prior to the reception of the RRCConnectionReconfiguration message, i.e. the UE re-establishes the RRC connection with the source eNB.

Figure 6:
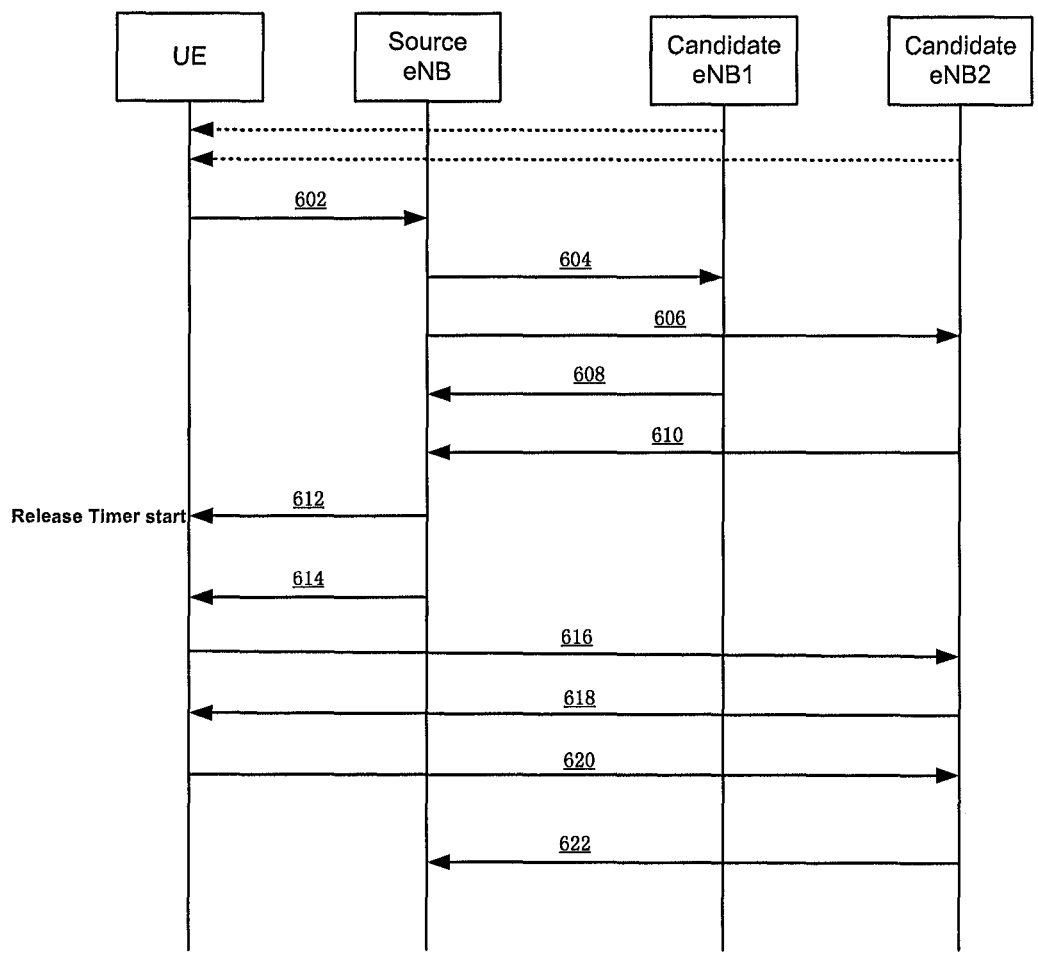
FIG. 6 is a call flow illustrating that a handover configuration related to a conditional handover command is released in response to receiving a handover configuration related to a handover command without the handover condition according to one embodiment.

FIG. 6 is a call flow illustrating that a handover configuration related to a conditional handover command is released in response to receiving a handover configuration related to a handover command without the handover condition according to one embodiment. The steps 602-612 are similar with steps 302-312, thereby the descriptions thereof are omitted for the purpose of brevity.

In step 614, the source eNB transmits a new handover configuration without the handover condition, e.g. using the legacy MobilityControlInfo IE over the RRCConnectionReconfiguration message. The candidate eNB2 is indicated to be the target eNB by the source eNB in FIG. 6.

In steps 616-620, similar with steps 220-224, e.g., the UE performs synchronization to the target eNB, i.e. the candidate eNB2 in FIG. 6, and accesses the corresponding target cell, the target eNB responds with UL allocation and timing advance, and then the UE sends the RRCConnectionReconfigurationComplete message (C-RNTI) to confirm the handover. Other steps, such as the communications between the target eNB and MME, are omitted because the legacy messages over S1 interface may be applied.

Figure 7:
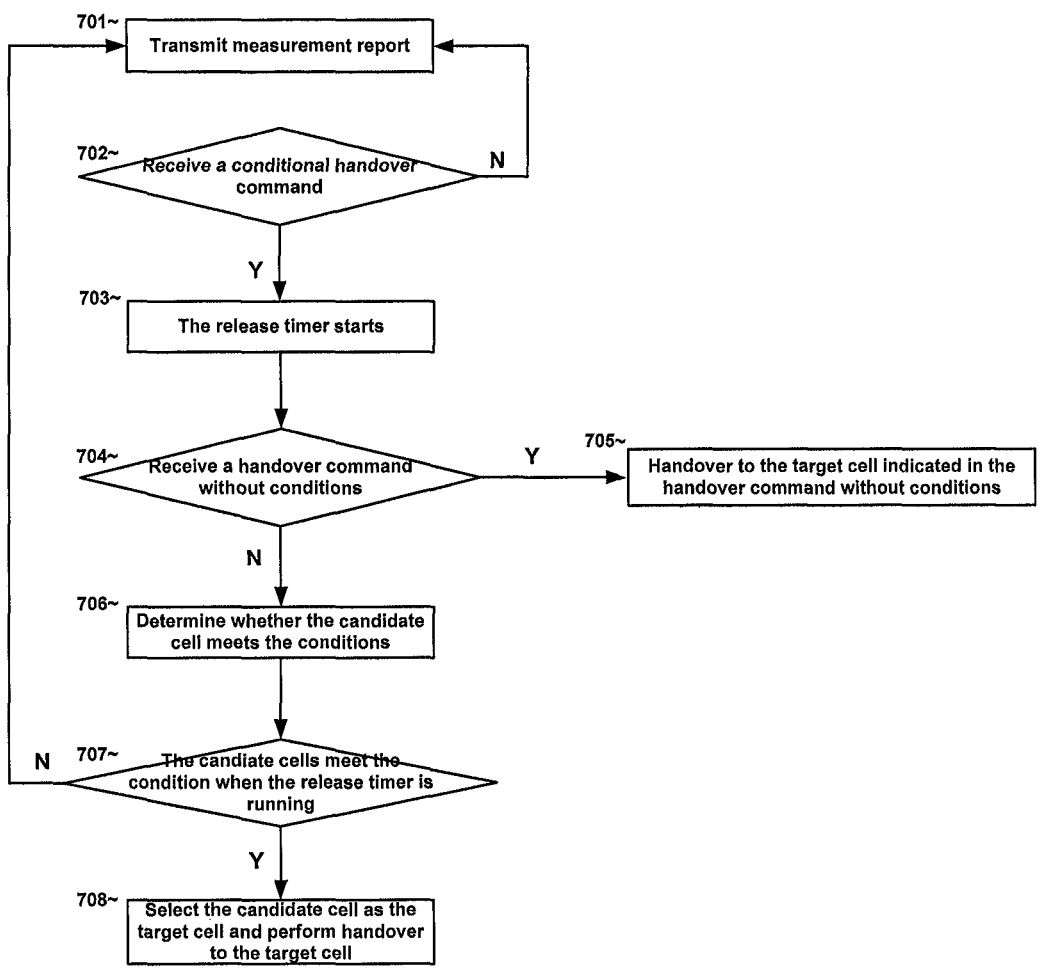
FIG. 7 is a process for UE handover according to one embodiment.

FIG. 7 is a process for UE handover according to one embodiment. The process illustrated in FIG. 7 may be implemented by software modules, hardware modules of the UE, or the combination thereof.

In step 701, the UE measures the signal strength of the neighbour cells and transmits the measurement report according to the measurement procedures configured by the eNB. In step 702, the UE receives a handover configuration related to a conditional handover command including at least one handover condition and a plurality of candidate cells over the RRCConnectionReconfiguration message from the source eNB, wherein the handover condition is configured per candidate cell. For example, the MobilityControlInfo IE defined in RRCConnectionReconfiguration message is used to include the at least one handover condition and a plurality of candidate cells. In step 703, the release timer indicated in the handover command is started once the RRCConnectionReconfiguration message, including the handover configuration, is received at the UE side. The release timer may be configured per conditional handover command or per candidate cell.

In step 704, the UE monitors whether the handover command without handover condition is received during the procedure of the conditional handover, e.g. over a new RRCConnectionReconfiguration message. If yes, the process continues to step 705. In step 705, the UE attempts to establish a RRC connection with the target cell indicated in the handover command without handover condition. If "NO" in step 704, the process continues to step 706, in which the UE determines whether one of the plurality of candidate cells meets the corresponding handover condition.

In step 707, the UE monitors the release timer during the conditional handover procedure.

In the case that the release timer is configured per conditional handover command, the UE applies the same release timer to all of the candidate cells. If none of the plurality of candidate cells meets the corresponding handover condition when the release timer expires, which is "NO" in step 707, the UE releases the handover configuration and goes back to step 701 for measuring the signal strength of the neighbour cells. If any of the plurality of candidate cells meets the corresponding handover condition when the release timer expires, which is "YES" in step 707, the process continues to step 708, in which the UE selects the candidate cell meeting the corresponding handover condition as the target cell and performs handover to the target cell.

In the case that the release timer is configured per candidate cell, the UE applies the release timer to the corresponding candidate cells respectively. If a candidate cell does not meet the corresponding handover condition when the corresponding release timer thereof expires, the UE releases the handover configuration corresponding to a candidate cell and continue to monitor whether other candidate cells meet the corresponding handover condition when the release timer thereof expires. If none of the plurality of candidate cells meets the corresponding handover condition when the expiration of the corresponding release timer for each of the plurality of candidate cells, which is "NO" in step 707, the UE releases the handover configuration and goes back to step 701 for measuring the signal strength of the neighbour cells. If one of the plurality of candidate cells meets the corresponding handover condition before the release timer thereof expires, which is "YES" in step 707, the process continues to step 708, in which the UE selects the candidate cell meeting the corresponding handover condition as the target cell and performs handover to the target cell.

As may be appreciated, the process illustrated in FIG. 7 need not necessarily be practiced in the shown sequence, and is able to be practiced without one or more of the specific steps, or with other steps not shown in the Figures.

Figure 8:
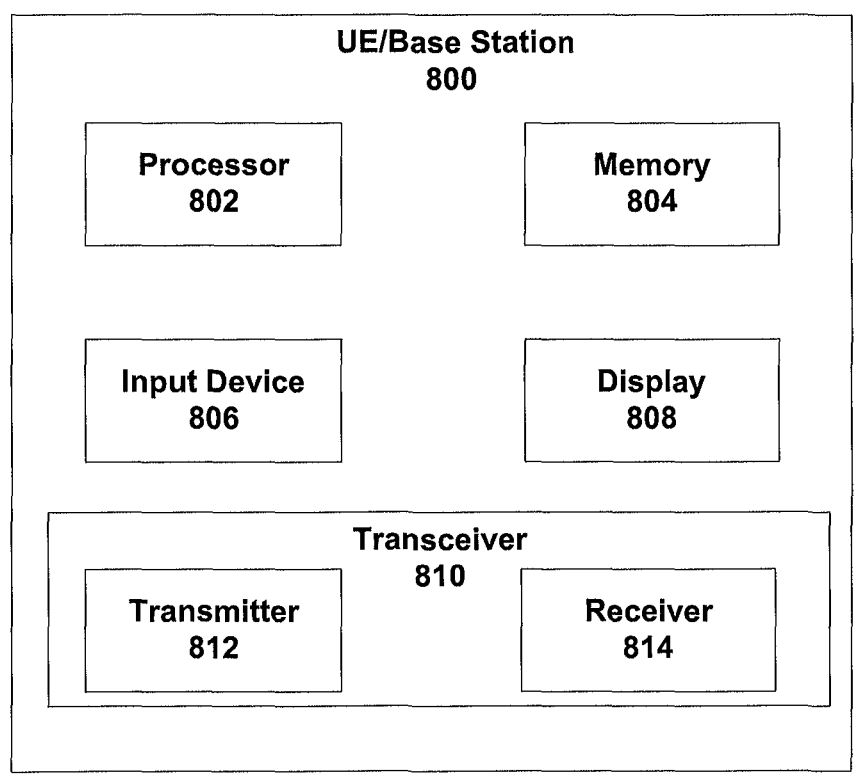
FIG. 8 is a schematic block diagram illustrating components of a UE/base station according to one embodiment.

FIG. 8 is a schematic block diagram illustrating components of a UE/Base Station according to one embodiment.

UE/Base Station 800 is an embodiment of the UE/Base Station described from FIGS. 1 to 7. Furthermore, UE/Base Station 800 may include a processor 802, a memory 804, and a transceiver 810. In some embodiments, UE/Base Station 800 may include an input device 806 and/or a display 808. In certain embodiments, the input device 806 and the display 808 may be combined into a single device, such as a touch screen.

The processor 802, in one embodiment, may include any known controller capable of executing computer-readable instructions and/or capable of performing logical operations. For example, the processor 802 may be a microcontroller, a microprocessor, a central processing unit ("CPU"), a graphics processing unit ("GPU"), an auxiliary processing unit, a field programmable gate array ("FPGA"), or a similar programmable controller. In some embodiments, the processor 802 executes instructions stored in the memory 804 to perform the methods and routines described herein. The processor 802 is communicatively coupled to the memory 804, the input device 806, the display 808, and the transceiver 810.

In some embodiments, the processor 802 controls the transceiver 810 to receive DL signals from the Base Station in the case that the equipment illustrated in FIG. 8 is a UE. For example, the processor 802 may control the transceiver 810 to receive the RRCConnectionReconfiguration message including the MobilityControlInfo IE for additional handover. In certain embodiments, the processor 802 may monitor DL signals received via the transceiver 810 for specific signals. For example, the processor 802 may monitor RS for wireless signal strength measurement based on RSRP/RSRQ. In another example, the processor 802 may control the transceiver 810 to transmit a higher layer signaling such as the RRCConnectionReconfiguration message in the case that the equipment illustrated in FIG. 8 is a Base Station.

The memory 804, in one embodiment, is a computer-readable storage medium. In some embodiments, the memory 804 includes volatile computer storage media. For example, the memory 804 may include RAM, including dynamic RAM ("DRAM"), synchronous dynamic RAM ("SDRAM"), and/or static RAM ("SRAM"). In some embodiments, the memory 804 includes non-volatile computer storage media. For example, the memory 804 may include a hard disk drive, flash memory, or any other suitable non-volatile computer storage device. In some embodiments, the memory 804 includes both volatile and non-volatile computer storage media. In some embodiments, the memory 804 stores data relating to the handover configuration. In some embodiments, the memory 804 also stores program code and related data, such as an operating system or other controller algorithms operating on the UE/Base Station 800.

The UE/Base Station 800 may optionally include an input device 806. The input device 806, in one embodiment, may include any known computer input device including a touch panel, a button, a keyboard, a stylus, a microphone, or the like. In some embodiments, the input device 806 may be integrated with the display 808, for example, as a touch screen or similar touch-sensitive display. In some embodiments, the input device 806 includes a touch screen such that text may be inputted using a virtual keyboard displayed on the touch screen and/or by handwriting on the touch screen. In some embodiments, the input device 806 includes two or more different devices, such as a keyboard and a touch panel. In certain embodiments, the input device 806 may include one or more sensors for monitoring the environment of the UE/Base Station 800.

The UE/Base Station 800 may optionally include a display 808. The display 808, in one embodiment, may include any known electronically controllable display or display device. The display 808 may be designed to output visual, audible, and/or haptic signals. In some embodiments, the display 808 includes an electronic display capable of outputting visual data to a user. For example, the display 808 may include, but is not limited to being, an LCD display, an LED display, an OLED display, a projector, or a similar display device capable of outputting images, text, or the like, to a user. As another non-limiting example, the display 808 may include a wearable display such as a smart watch, smart glasses, a heads-up display, or the like. Further, the display 808 may be a component of a smart phone, a personal digital assistant, a television, a table computer, a notebook (laptop) computer, a personal computer, a vehicle dashboard, or the like.

In certain embodiments, the display 808 may include one or more speakers for producing sound. For example, the display 808 may produce an audible alert or notification (e.g., a beep or chime). In some embodiments, the display 808 includes one or more haptic devices for producing vibrations, motion, or other haptic feedback. In some embodiments, all or portions of the display 808 may be integrated with the input device 806. For example, the input device 806 and display 808 may form a touch screen or similar touch-sensitive display. In other embodiments, the display 808 may be located near the input device 806.

The transceiver 810, in one embodiment, is configured to communicate wirelessly with the Base Station in the case that the equipment illustrated in FIG. 8 is a UE, and vice versa. In certain embodiments, the transceiver 810 comprises a transmitter 812 and a receiver 814. The transmitter 812 is used to transmit UL communication signals to the Base Station and the receiver 814 is used to receive DL communication signals from the Base Station in the case that the equipment illustrated in FIG. 8 is a UE, and vice versa. For example, the receiver 814 may receive the RRCConnectionReconfiguration message from the Base Station. Based on the receiving system information, the transceiver 810 may monitor the wireless signal from the candidate cells.

The transmitter 812 and the receiver 814 may be any suitable type of transmitter or receiver, respectively. Although only one transmitter 812 and one receiver 814 are illustrated, the transceiver 810 may have any suitable number of transmitters 812 and receivers 814. For example, in some embodiments, the UE/Base Station 800 includes a plurality of transmitter 812 and receiver 814 pairs for communicating on a plurality of wireless networks and/or radio frequency bands, with each transmitter 812 and receiver 814 pair configured to communicate on a different wireless network and/or radio frequency band than the other transmitter 812 and receiver 814 pairs.

Embodiments may be practiced in other specific forms. The described embodiments are to be considered in all respects only as illustrative and not as restrictive. The scope of the invention is, therefore, indicated by the appended claims rather than by the foregoing description. All changes which fall within the meaning and range of equivalency of the claims are to be embraced within their scope.

The invention claimed is:

1. An apparatus comprising:
   a transceiver that receives a radio resource control (RRC) connection reconfiguration message comprising a handover configuration related to a conditional handover command including at least one handover condition and a plurality of candidate cells, wherein the handover condition is configured by the RRC connection reconfiguration message per candidate cell; and
   a processor that selects a target cell from the plurality of candidate cells in response to the target cell meeting the corresponding handover condition, wherein the conditional handover command is associated with a release timer, and the apparatus releases the handover configuration in response to none of the plurality of candidate cells meeting the corresponding handover condition when the release timer expires.

2. The apparatus according to claim 1, wherein the handover condition includes an offset and a timer for handover trigger, and the processor selects the target cell from the plurality of candidate cells in response to the target cell becoming offset better than a source cell during the timer for handover trigger.

3. A method comprising:
   receiving a radio resource control (RRC) connection reconfiguration message comprising a handover configuration related to a conditional handover command including at least one handover condition and a plurality of candidate cells, wherein the handover condition is configured by the RRC connection reconfiguration message per candidate cell; and
   selecting a target cell from the plurality of candidate cells in response to the target cell meeting the corresponding handover condition, wherein the conditional handover command is associated with a release timer, the handover configuration is released in response to none of the plurality of candidate cells meeting the corresponding handover condition when the release timer expires.

4. The method according to claim 3, wherein the handover condition includes an offset and a timer for handover trigger, and the target cell is selected from the plurality of candidate cells in response to the target cell becoming offset better than a source cell during the timer for handover trigger.

5. The method according to claim 3, wherein the conditional handover command includes events for releasing the handover configuration, and the handover configuration corresponding to a candidate cell is released in response to the events being triggered for the candidate cell.

6. The method according to claim 5, wherein the events include one or both of the following:

the candidate cell becomes worse than a threshold value during a first configured timer; and/or the candidate cell becomes offset worse than the source cell during a second configured timer.

7. The method according to claim 3, further comprising:
receiving a handover configuration related to a handover command without the handover condition; and
releasing the handover configuration related to the conditional handover command.

8. The method according to claim 3, wherein the at least one handover conditions is included in an information element of MobilityControlInfo in RRCConnectionReconfiguration message.

9. An apparatus comprising:
a transceiver that transmits a radio resource control (RRC) connection reconfiguration message comprising a handover configuration related to a conditional handover command including at least one handover condition and a plurality of candidate cells, wherein the handover condition is configured by the RRC connection reconfiguration message per candidate cell, a target cell is selected from the plurality of candidate cells by a user equipment in response to the target cell meeting the corresponding handover condition, the conditional handover command is associated with a release timer, and the handover configuration is released in response to none of the plurality of candidate cells meeting the corresponding handover condition when the release timer expires.

10. A method comprising:
transmitting a radio resource control (RRC) connection reconfiguration message comprising a handover configuration related to a conditional handover command including at least one handover condition and a plurality of candidate cells, wherein the handover condition is configured by the RRC connection reconfiguration message per candidate cell, a target cell is selected from the plurality of candidate cells by a user equipment in response to the target cell meeting the corresponding handover condition, the conditional handover command is associated with a release timer, and the handover configuration is released in response to none of the plurality of candidate cells meeting the corresponding handover condition when the release timer expires.

11. The method according to claim 10, wherein the handover condition includes an offset and a timer for handover trigger, and the target cell is selected from the plurality of candidate cells by the user equipment in response to the target cell becoming offset better than a source cell during the timer for handover trigger.

12. The method according to claim 10, wherein the conditional handover command includes events for releasing the handover configuration, the handover configuration corresponding to a candidate cell is released in response to the events being triggered for the candidate cell.

13. The method according to claim 12, wherein the events include one or both of the following:

the candidate cell becomes worse than a threshold value during a first configured timer; and/or the target cell becomes offset worse than the source cell during a second configured timer.

14. The method according to claim 10, further comprising transmitting a handover configuration related to a handover command without the handover condition, the handover configuration related to the conditional handover command is released by the user equipment.

15. The method according to claim 10, wherein the at least one handover condition is included in an information element of MobilityControlInfo in RRCConnectionReconfiguration message.

* * * * *